United States Patent
Park

(10) Patent No.: US 11,870,113 B2
(45) Date of Patent: Jan. 9, 2024

(54) METHOD FOR MEASURING IMPEDANCE OF FUEL CELL STACK IN VEHICLE

(71) Applicants: HYUNDAI MOTOR COMPANY, Seoul (KR); KIA MOTORS CORPORATION, Seoul (KR)

(72) Inventor: Gun Hyung Park, Seongnam-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 290 days.

(21) Appl. No.: 17/012,601

(22) Filed: Sep. 4, 2020

(65) Prior Publication Data

US 2021/0184236 A1 Jun. 17, 2021

(30) Foreign Application Priority Data

Dec. 12, 2019 (KR) .................. 10-2019-0165711

(51) Int. Cl.
*H01M 8/04537* (2016.01)
*B60L 58/30* (2019.01)
(Continued)

(52) U.S. Cl.
CPC ......... *H01M 8/04649* (2013.01); *B60L 58/13* (2019.02); *B60L 58/30* (2019.02);
(Continued)

(58) Field of Classification Search
CPC ......... H01M 8/04313; H01M 8/04537; H01M 8/04634–04656; H01M 8/04895–04953;
(Continued)

(56) References Cited

U.S. PATENT DOCUMENTS

2009/0226770 A1* 9/2009 Manabe ............ H01M 8/04947
 429/431
2010/0028729 A1* 2/2010 Billups ............... H01M 8/0494
 429/432
(Continued)

FOREIGN PATENT DOCUMENTS

KR 10-1136500 B1 4/2012
KR 10-1646854 B1 8/2016
(Continued)

*Primary Examiner* — Jonathan Crepeau
*Assistant Examiner* — Jacob Buchanan
(74) *Attorney, Agent, or Firm* — McDonnell Boehnen Hulbert & Berghoff LLP

(57) ABSTRACT

A method for accurately measuring the impedance of the fuel cell stack in the vehicle during operation of the vehicle includes determining whether measuring the impedance of the fuel cell stack is requested during driving of the vehicle driven by using a power of a fuel cell stack, switching a DC-DC converter connecting the fuel cell stack and a battery to each other to a buck mode when measuring the impedance is requested, thereby blocking output current of the fuel cell stack from flowing to the battery through the DC-DC converter, determining a first current value of the fuel cell stack for measuring the impedance, controlling a resistance value of a COD variable resistor consuming the output current of the fuel cell stack according to the first current value, and measuring the impedance of the fuel cell stack while the output current of the fuel cell stack is maintained at the first current value.

12 Claims, 3 Drawing Sheets

(51) Int. Cl.
*H01M 8/04858* (2016.01)
*B60L 58/40* (2019.01)
*B60L 58/13* (2019.01)
*H01M 16/00* (2006.01)

(52) U.S. Cl.
CPC .......... *B60L 58/40* (2019.02); *H01M 8/0491* (2013.01); *H01M 8/04952* (2016.02); *H01M 16/006* (2013.01); *B60L 2210/12* (2013.01); *B60L 2210/14* (2013.01); *H01M 2220/20* (2013.01); *H01M 2250/20* (2013.01)

(58) Field of Classification Search
CPC .... B60L 58/00–13; B60L 58/30; B60L 58/32; B60L 58/40
See application file for complete search history.

(56) References Cited

U.S. PATENT DOCUMENTS

| | | | |
|---|---|---|---|
| 2010/0286939 A1* | 11/2010 | Oh .................... | H01M 8/04589 702/65 |
| 2013/0057292 A1* | 3/2013 | Hasegawa ......... | H01M 8/04559 324/430 |
| 2015/0099204 A1* | 4/2015 | O'Neill ............. | H01M 8/04559 429/432 |

FOREIGN PATENT DOCUMENTS

| | | |
|---|---|---|
| KR | 10-1829105 B1 | 2/2018 |
| KR | 10-1832685 B1 | 2/2018 |
| KR | 2018-0042235 A | 4/2018 |
| KR | 10-1866072 B1 | 6/2018 |
| KR | 10-1870520 B1 | 6/2018 |
| KR | 10-1887787 B1 | 8/2018 |

* cited by examiner

METHOD FOR MEASURING IMPEDANCE OF FUEL CELL STACK IN VEHICLE

CROSS REFERENCE TO RELATED APPLICATIONS

The present application claims priority to Korean Patent Application No. 10-2019-0165711, filed Dec. 12, 2019, the entire contents of which is incorporated herein for all purposes by this reference.

BACKGROUND

Field

The present disclosure relates to a method for measuring the impedance of a fuel cell stack in a vehicle and, more particularly, to a method for accurately measuring the impedance of a fuel cell stack during operation of a vehicle.

Description of the Related Art

In general, measuring the impedance is one method of determining a state of a fuel cell stack. By measuring the impedance of the fuel cell stack for various frequency bands, it is possible to determine a physical phenomenon of an internal state of the fuel cell stack.

In a high frequency region, ohmic loss may be determined by estimating the quantity of a charge inside the fuel cell stack, and in a low frequency region, material transfer loss characteristics of a cathode catalyst layer and a gas diffusion layer of a fuel cell may be estimated. In addition, in a frequency region between the high frequency region and the low frequency region, it is possible to determine an activation loss including hydrogen ion migration and electrochemical reaction characteristics in a porous catalyst layer of the fuel cell.

Generally, after applying a small AC signal to a voltage terminal (output terminal) of a fuel cell stack for each frequency band at an operating point (for example, constant current or constant voltage) of a steady state of the fuel cell stack, the impedance is measured using an amplitude and phase difference of a response signal to the applied signal.

However, during operation of the vehicle, an output of the fuel cell stack has difficulty reaching a steady state at a predetermined driving point for measuring the impedance, and even when the steady state is reached, maintaining the steady state is difficult.

Furthermore, even when the output of the fuel cell stack reaches a steady state at a predetermined operating point, it is difficult to accurately measure the impedance value of the fuel cell stack because there are impedances of various peripheral components connected to the fuel cell stack. Accordingly, accuracy of measuring the impedance of the fuel cell stack is degraded.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made in view of the above, and an object of the present disclosure is to provide a method for measuring the impedance of a fuel cell stack in a vehicle that measurement of the impedance of the fuel cell stack to be accurately accomplished during operation of the vehicle.

In order to achieve the above objective according to one aspect of the present disclosure, there is provided a method for measuring the impedance of a fuel cell stack in a vehicle, the method including a first step of deciding whether measuring the impedance of the fuel cell stack is requested during driving of the vehicle driven by using a power of a fuel cell stack, a second step of switching a DC-DC converter connecting the fuel cell stack and a battery to each other to a buck mode when measuring the impedance is requested, thereby blocking output current of the fuel cell stack from flowing to the battery through the DC-DC converter, a third step of determining a first current value of the fuel cell stack for measuring the impedance, a fourth step of controlling a resistance value of a COD variable resistor consuming the output current of the fuel cell stack according to the first current value, and a fifth step of measuring the impedance of the fuel cell stack while the output current of the fuel cell stack is maintained at the first current value.

According to the present disclosure, when determined that measuring the impedance of the fuel cell stack is requested in the first step, before switching the DC-DC converter to the buck mode, a state of charge (SOC) of the battery may be increased to no less than a preset first reference value through charging using the fuel cell stack.

In addition, according to the present disclosure, when the DC-DC converter is operated in the buck mode, the fuel cell stack may be operated to output current according to requested current of the COD variable resistor and stack peripheral devices.

Accordingly, when the requested current for driving the stack peripheral devices is changed while the impedance of the fuel cell stack is measured in the fifth step, the resistance value of the variable resistor for each preset frequency band may be changed, thereby maintaining the output of the fuel cell stack to the first current value.

In addition, the SOC of the battery is monitored during impedance of the fuel cell stack is measured for each preset frequency band in the fifth step. As a result, when the SOC of the battery is no greater than a second reference value less than the first reference value by a predetermined value, measuring the impedance of the fuel cell stack may be stopped and the DC-DC converter may be switched to a boost mode, thereby allowing the output of the fuel cell stack to be supplied to a motor for driving a vehicle through the DC-DC converter.

In addition, according to the present disclosure, when measuring the impedance of the fuel cell stack is completed in the fifth step, whether measuring the impedance of the fuel cell stack is re-requested may be determined. When measuring the impedance of the fuel cell stack is re-requested, a second current value for measuring the impedance may be determined, the resistance value of the COD variable resistor may be controlled according to the second current value, and the impedance of the fuel cell stack may be re-measured while the output current of the fuel cell stack maintains the second current value. At this time, the second current value may be different from the first current value.

As described above, the present disclosure, through means for solving the above problems, can control the output current of the fuel cell stack to a desired constant current value when measuring the impedance of the fuel cell stack is requested. Accordingly, at the desired operating point (current value), the impedance of the fuel cell stack can be measured, and also at various operating points, the impedance of the fuel cell stack can be measured.

BRIEF DESCRIPTION OF THE FIGURES

The above and other objectives, features, and other advantages of the present disclosure will be more clearly understood from the following detailed description when taken in conjunction with the accompanying drawings, in which.

DETAILED DESCRIPTION

Figure 1:
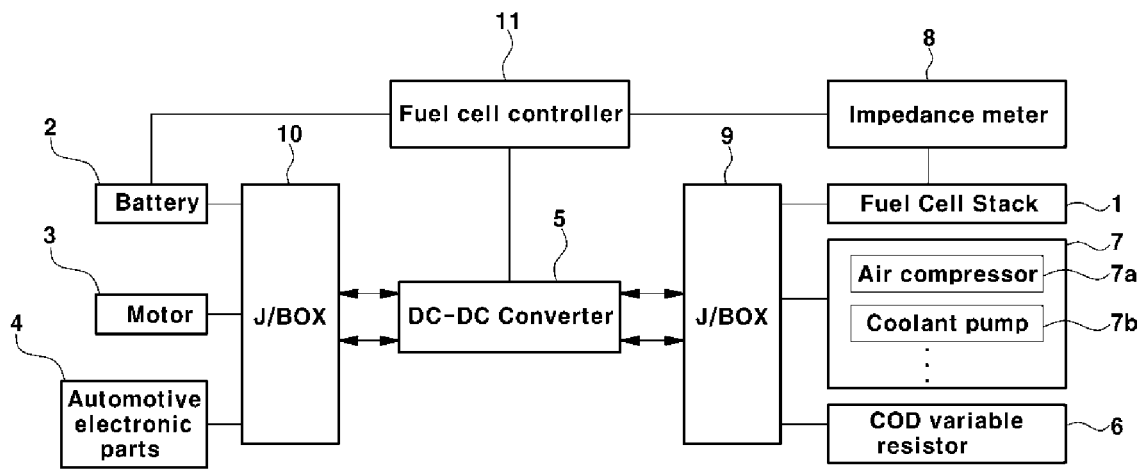
FIG. 1 is a view illustrating a fuel cell system of a vehicle according to the present disclosure.

Hereinafter, the present disclosure will be described in detail with reference to the accompanying drawings so as to be easily implemented by those skilled in the art. Throughout the drawings, the same reference numerals will refer to the same or like parts.

In general, in order to measure impedance of a fuel cell stack in a vehicle, it is necessary for an output of the fuel cell stack to reach a steady state of constant current or constant voltage.

In other words, in order to measure the impedance of the fuel cell stack installed in the vehicle, it is necessary for the fuel cell stack to reach a constant current state in which the output thereof is maintained at a constant current value or a constant voltage state in which the output thereof is maintained at a constant voltage value.

That is, in order to accurately measure the impedance of the fuel cell stack while the vehicle is driven by using power of the fuel cell stack, it is necessary for the fuel cell stack to maintain a state in which a constant current or a constant voltage is output for a predetermined time.

When a condition of measuring the impedance of the fuel cell stack is satisfied, measuring the impedance may be performed for each frequency domain band of the fuel cell stack.

FIG. 1 is a view illustrating a fuel cell system for a vehicle according to the present disclosure.

As illustrated in FIG. 1, when installed in a vehicle, a fuel cell stack 1 is configured to be connected to a battery 2, which may be charged by output current of the fuel cell stack 1, a DC-DC converter 5, which is capable of performing power switching when the battery 2 is charged, a motor 3, which is for driving the vehicle and is driven using the battery 2 as a power source (power supply source), stack peripheral devices 7, which are used when the fuel cell stack 1 is operated, and the like. The stack peripheral devices 7 include an air compressor 7a configured to supply air to the fuel cell stack 1, a coolant pump 7b configured to circulate and supply coolant to the fuel cell stack 1, and the like. For reference, the stack peripheral devices 7 are also referred to as a balance of plant (BOP).

Since the fuel cell stack 1 is connected to various components in the vehicle as above, it is not easy to accurately measure the impedance of the fuel cell stack 1 while the vehicle is running. In addition, even though the impedance of the fuel cell stack 1 is measured when the output of the fuel cell stack 1 reaches the steady state of a constant current or a constant voltage, the above-measured impedance value includes the impedance of the components connected to the fuel cell stack 1 so that accuracy of measuring the impedance is reduced.

Therefore, in order to accurately measure the impedance of the fuel cell stack 1, it is necessary to measure only the impedance of the fuel cell stack 1 in a steady state in which a constant current is output from the fuel cell stack 1.

In addition, since it takes a relatively long time to measure the impedance of the fuel cell stack 1 in a low frequency band, in order to measure the impedance of the fuel cell stack 1 for each frequency band, a steady state in which a constant current is output from the fuel cell stack 1 for a predetermined time should be maintained.

In addition, in order to determine a physical phenomenon of an internal state of a fuel cell for each current region, it is necessary not only to accurately measure the impedance of the fuel cell stack 1 but also to measure the impedance at various current regions of the fuel cell stack 1.

Accordingly, in the present disclosure, the output current of the fuel cell stack 1 may be accurately measured by maintaining the output current of the fuel cell stack 1 in a steady state for a predetermined time. At the same time, the output current of the fuel cell stack 1 is controlled to a desired current value, whereby the impedance in various current regions of the fuel cell stack 1 may be measured.

With reference to FIG. 1, the fuel cell system of the present disclosure is configured to include a DC-DC converter 5, which is capable of switching the output power of the fuel cell stack 1, thereby supplying the output power to the battery 2, and a resistor, which may exhaust the electric power of the fuel cell stack 1 when the fuel cell system is stopped.

Here, the DC-DC converter 5 is electrically connected to the fuel cell stack 1 through a first junction box 9, and is electrically connected to the battery 2 through a second junction box 10. That is, the fuel cell stack 1 is connected to the battery 2 through the DC-DC converter 5.

In addition, the first junction box 9 electrically connects the fuel cell stack 1 to the DC-DC converter 5. At the same time, the first junction box 9 electrically connects the fuel cell stack 1 to the stack peripheral devices 7, and electrically connects the fuel cell stack 1 to a COD variable resistor 6.

In addition, the second junction box 10 connects the battery 2 to the DC-DC converter 5. At the same time, the second junction box 10 connects the battery 2 to the motor 3, and connects the battery 2 to automotive electronic parts 4. In addition, in some embodiments, the automotive electronic parts 4 are in-vehicle automotive electronic parts driven by consuming the power of the battery 2, and the motor 3 is a device for generating a driving force of the vehicle.

The resistor is a variable resistor having a resistance value that is varied by a command of a fuel cell controller 11, and specifically, the resistor is a COD variable resistor 6.

The COD variable resistor 6 may rapidly heat the coolant supplied to the fuel cell stack 1 during a cold start of the vehicle, thereby increasing the temperature of the coolant and a function to remove residual oxygen inside the fuel cell stack 1 when the vehicle is started or shut down.

The fuel cell controller 11 may change and control the resistance value of the COD variable resistor 6 in order to allow the fuel cell stack 1 to be operable at, at least, two current values selected from the current region of the fuel cell stack 1.

Figure 2:
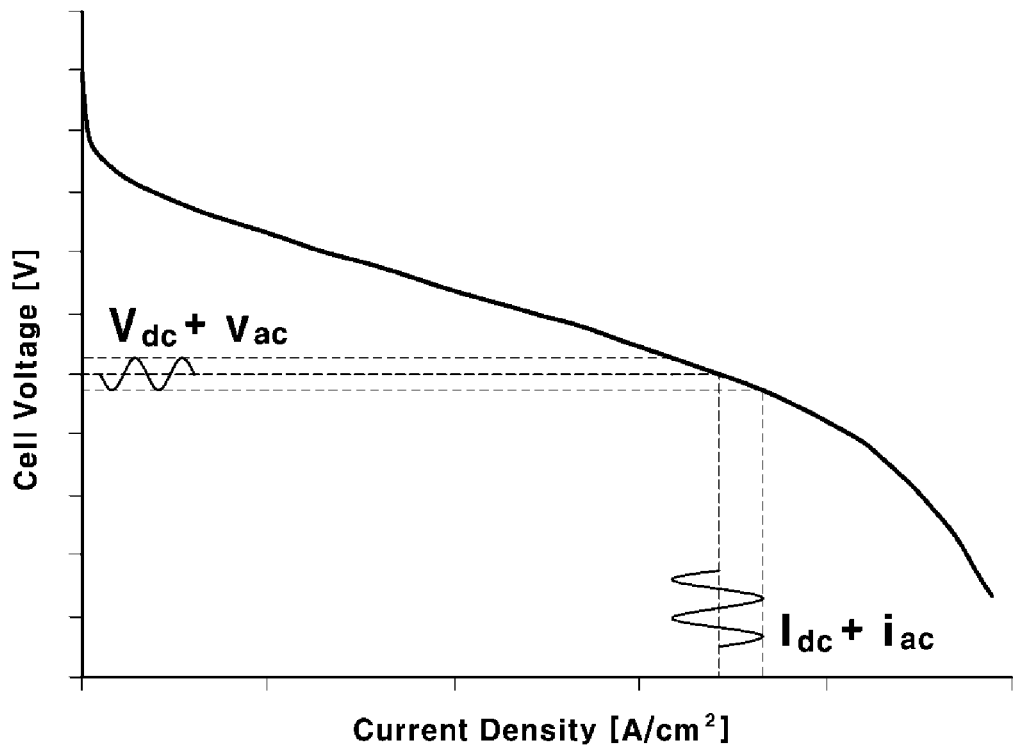
FIG. 2 is a graph illustrating an example of a current region in which measuring the impedance of a fuel cell stack is possible.

The current region of the fuel cell stack 1 is a current region that the fuel cell stack 1 may output during operation of the fuel cell stack 1. FIG. 2 is a graph illustrating an operating line of the fuel cell stack as an example. As illustrated in FIG. 2, the fuel cell stack 1 may be operated at a predetermined operating point and may output a voltage and a current corresponding to each operating point. For example, the fuel cell stack 1 may output current in the range of 0 to 100 A with 300V as a reference and output current in the range of 0 to 120 A with 250V as a reference.

More specifically, the fuel cell controller 11 controls the resistance value of the COD variable resistor 6 so that the operation of the fuel cell stack 1 is performed at a current value at which impedance may be desirably measured in the current region of the fuel cell stack 1.

The COD variable resistor 6 is a variable resistance device that is configured such that the resistance value is to be changed by a command transmitted from the fuel cell controller 11. Therefore, the output current of the fuel cell stack 1 may be controlled by controlling the resistance value of the COD variable resistor 6.

When the impedance of the fuel cell stack 1 is measured, in order to remove the influence of the components (motor, automotive electronic parts, and the like) connected to the DC-DC converter 5 through the second junction box 10 and to secure the accuracy of measuring the impedance of the fuel cell stack 1, the fuel cell controller 11 switches the DC-DC converter 5 to a buck mode.

The DC-DC converter 5 blocks the current generated in the fuel cell stack 1 from flowing to the battery 2, when operating in the buck mode. That is, the DC-DC converter 5 is to let an internal circuit thereof, which is configured to energize the output current of the fuel cell stack 1 to the second junction box 10, to be cut off, when operating in the buck mode. In other words, the DC-DC converter 5 may include the internal circuit configured to prevent the output current of the fuel cell stack 1 from being applied to the second junction box 10 when operating in the buck mode.

Therefore, when the DC-DC converter 5 is switched to the buck mode, the output current of the fuel cell stack 1 is blocked from flowing toward the battery 2 through the DC-DC converter 5.

When the DC-DC converter 5 is not switched to the buck mode, the accuracy of measuring the impedance may be degraded due to the battery 2, the motor 3, and the like connected to the second junction box 10 when the impedance of the fuel cell stack 1 is measured. Therefore, when measuring the impedance of the fuel cell stack 1 is requested, it is necessary to switch the DC-DC converter 5 to the buck mode.

The fuel cell controller 11 may receive a request signal for measuring the impedance of the fuel cell stack 1 from the impedance meter 8. The impedance meter 8 may request the fuel cell controller 11 to build a condition of the system for measuring the impedance before measuring the impedance of the fuel cell stack 1. Provided the request signal is received from the impedance meter 8, the fuel cell controller 11 may determine that measuring the impedance of the fuel cell stack 1 is requested.

Accordingly, the fuel cell controller 11 switches the DC-DC converter 5 into the buck mode when the request signal for measuring the impedance of the fuel cell stack 1 is received.

For normal operation of the motor 3 and the automotive electronic parts 4 driven by using the power of the battery 2, the fuel cell controller 11 switches the DC-DC converter 5 to the buck mode when a state of charge (SOC) of the battery 2 is no less than a predetermined first reference value $\alpha$.

Therefore, when the SOC of the battery 2 is less than the first reference value $\alpha$ when the request signal for measuring the impedance of the fuel cell stack 1 is received, the fuel cell controller 11 increases the SOC of the battery 2 to no less than the above first reference value $\alpha$ before switching the DC-DC converter 5 to the buck mode.

The fuel cell controller 11 may increase the SOC of the battery 2 by charging the battery 2 using the fuel cell stack 1. In this case, the fuel cell controller 11 may switch the output power of the fuel cell stack 1 supplied to the battery 2 using the DC-DC converter 5.

In addition, when the SOC of the battery 2 is no greater than a second reference value $\beta$ after the DC-DC converter 5 is switched to the buck mode, the fuel cell controller 11 switches the DC-DC converter 5 to a boost mode. The second reference value $\beta$ is set to a SOC less than the first reference value $\alpha$ by a predetermined value.

The fuel cell controller 11 determines that the driving stability of the motor 3 using the electric power of the battery 2 is degraded when the SOC of the battery 2 is no greater than the second reference value $\beta$ and switches the DC-DC converter 5 to the boost mode to secure driving safety of the vehicle. Due to excessive discharge of the battery 2, the SOC of the battery 2 may be reduced to no greater than the second reference value $\beta$.

When operating in the boost mode, the DC-DC converter 5 may transform the power of the fuel cell stack 1 into a power level that the motor 3 may use, thereby directly applying the transformed power of the fuel cell stack 1 to the motor 3. To this end, the DC-DC converter 5 is configured to include the internal circuit to boost the output of the fuel cell stack 1 to the driving voltage level of the motor 3 when operating in the boost mode.

That is, the fuel cell controller 11 switches the DC-DC converter 5 to the boost mode when the SOC of the battery 2 decreases to no greater than the second reference value $\beta$, thereby allowing the output of the fuel cell stack 1 to be used in driving the vehicle.

The fuel cell controller 11 determines a current value (first current value) for measuring the impedance of the fuel cell stack 1 when the SOC of the battery 2 is greater than the second reference value $\beta$ after the DC-DC converter 5 is switched to the buck mode.

In this case, the first current value is a current value selected from among current values included in the current region of the fuel cell stack 1 and may be determined to the current value appropriate for identifying a physical phenomenon of the internal state of the fuel cell stack 1.

After determining the first current value, the resistance value (first resistance value) of the COD variable resistor 6 may be determined and controlled on the basis of the first current value.

When the DC-DC converter 5 is operated in the buck mode, the output current of the fuel cell stack 1 is determined in accordance with the requested current (current consumption) of the stack peripheral devices 7 and the COD variable resistor 6. In other words, when the DC-DC converter 5 is operated in the buck mode, the fuel cell stack 1 is run to output a current according to the requested current of the COD variable resistor 6 and the stack peripheral devices 7.

Accordingly, the current consumption of the COD variable resistor 6 may be calculated by subtracting the requested current value of the stack peripheral devices 7 from the first current value, and the first resistance value of the COD variable resistor 6 may be determined according to the current consumption of the COD variable resistor 6.

The resistance value of the COD variable resistor 6 may be controlled to the first resistance value according to the command of the fuel cell controller 11. When the COD variable resistor 6 is controlled to the first resistance value, the fuel cell stack 1 may operate at the first current value. In other words, when the resistance value of the COD variable resistor 6 is controlled to the first resistance value, the fuel cell stack 1 is operated in a state of outputting a current corresponding to the first current value.

Since the COD variable resistor 6 is a component, power consumption of which is fixed, when the resistance value is controlled to the first resistance value, a predetermined current is consumed according to the first resistance value.

Accordingly, the operating point of the fuel cell stack 1 may be controlled to the first current value by controlling the resistance value of the COD variable resistor 6 to the first resistance value according to the command of the fuel cell controller 11.

After the COD variable resistor 6 is driven according to the first resistance value and the stack peripheral devices 7 are driven for driving the fuel cell stack 1, when the output current of the fuel cell stack 1 is stabilized to a steady state, the impedance meter 8 measures the impedance of the fuel cell stack 1 for each frequency band.

When the output current of the fuel cell stack 1 maintains the first current value, the impedance meter 8 measures the impedance of the fuel cell stack 1. When the impedance meter 8 measures the impedance of the fuel cell stack 1, the output voltage of the fuel cell stack 1 is controlled constantly.

In order to allow the output current of the fuel cell stack 1 to provide an amplitude within a predetermined range when the impedance is measured, the air compressor 7a may supply a predetermined flow rate of air to the fuel cell stack 1. Provided the output current of the fuel cell stack 1 deviates from the amplitude of a predetermined range, the amplitude of the output current of the fuel cell stack 1 may be controlled to be within the predetermined range by adjusting the flow rate of air supplied to the fuel cell stack 1.

The fuel cell controller 11 monitors the SOC of the battery 2 while the impedance meter 8 measures the impedance of the fuel cell stack 1 for each predetermined frequency band.

When the SOC of the battery 2 becomes no greater than the second reference value β during the impedance of the fuel cell stack 1 is measured, the controller 11 immediately stops measuring the impedance to secure the driving safety of the vehicle and switches the DC-DC converter 5 to the boost mode.

When the DC-DC converter 5 is operated in the boost mode, the output of the fuel cell stack 1 is used for driving of the vehicle.

On the other hand, since the stack peripheral devices 7 include the air compressor 7a, the coolant pump 7b, and the like related to the operation and power generation of the fuel cell stack 1, the requested current for driving the stack peripheral devices 7 may vary depending on the state of the fuel cell stack 1.

Therefore, when the requested current of the stack peripheral devices 7 changes while the impedance of the fuel cell stack 1 is measured, by changing the resistance value of the COD variable resistor 6, the output of the fuel cell stack 1 is enforced to maintain the first current value.

More specifically, the output current of the fuel cell stack 1 may change as the requested current of the stack peripheral devices 7 varies, and in this case, it becomes impossible to measure the impedance of the fuel cell stack 1 for each frequency band.

Therefore, provided the requested current of the stack peripheral devices 7 changes, the requested current of the COD variable resistor 6 is recalculated by subtracting the changed requested current of the stack peripheral devices 7 from the first current value. Then the resistance value of the COD variable resistor 6 is re-determined in accordance with the recalculated requested current of the COD variable resistor 6. At this time, the resistance value of the re-determined COD variable resistor 6 refers to a first-prime resistance value.

The fuel cell controller 11 controls the resistance value of the COD variable resistor 6 to the first-prime resistance value, whereby the output current of the fuel cell stack 1 becomes to maintain the first current value.

When measuring the impedance of the fuel cell stack 1 is completed, the fuel cell controller 11 re-determines whether measuring the impedance is necessary. That is, when measuring the impedance at the first current value is completed, the fuel cell controller 11 determines whether measuring the impedance of the fuel cell stack 1 is further requested.

To this end, the fuel cell controller 11 monitors whether the request signal for measuring the impedance is retransmitted from the impedance meter 8. The fuel cell controller 11 re-determines another current value (second current value) for measuring the impedance of the fuel cell stack 1 when the request signal is retransmitted from the impedance meter 8.

In other words, the fuel cell controller 11 determines the second current value for measuring the impedance of the fuel cell stack 1 according to the re-request of the impedance meter 8. Here, the second current value is a current value included in the operating region of the fuel cell stack 1 and is determined as a current value different from the first current value.

The fuel cell controller 11 controls the resistance value of the COD variable resistor 6 on the basis of the second current value, and the impedance meter 8 measures the impedance of the fuel cell stack 1 that is operated to output the second current value. At this time, the resistance value of the COD variable resistor 6 may be controlled to the second resistance value.

In addition, the fuel cell controller 11 may re-perform the same control process as when the fuel cell stack 1 is operated to output the first current value.

After measuring the impedance of the fuel cell stack 1 operated at the second current value, another current value may be selected and the impedance of the fuel cell stack 1 may be measured at the selected current value. Accordingly, by repeating, the impedance of the fuel cell stack 1 may be measured at various operating points (current values).

Hereinafter, a control process for measuring the impedance of the fuel cell stack 1 will be described with reference to FIG. 3.

Figure 3:
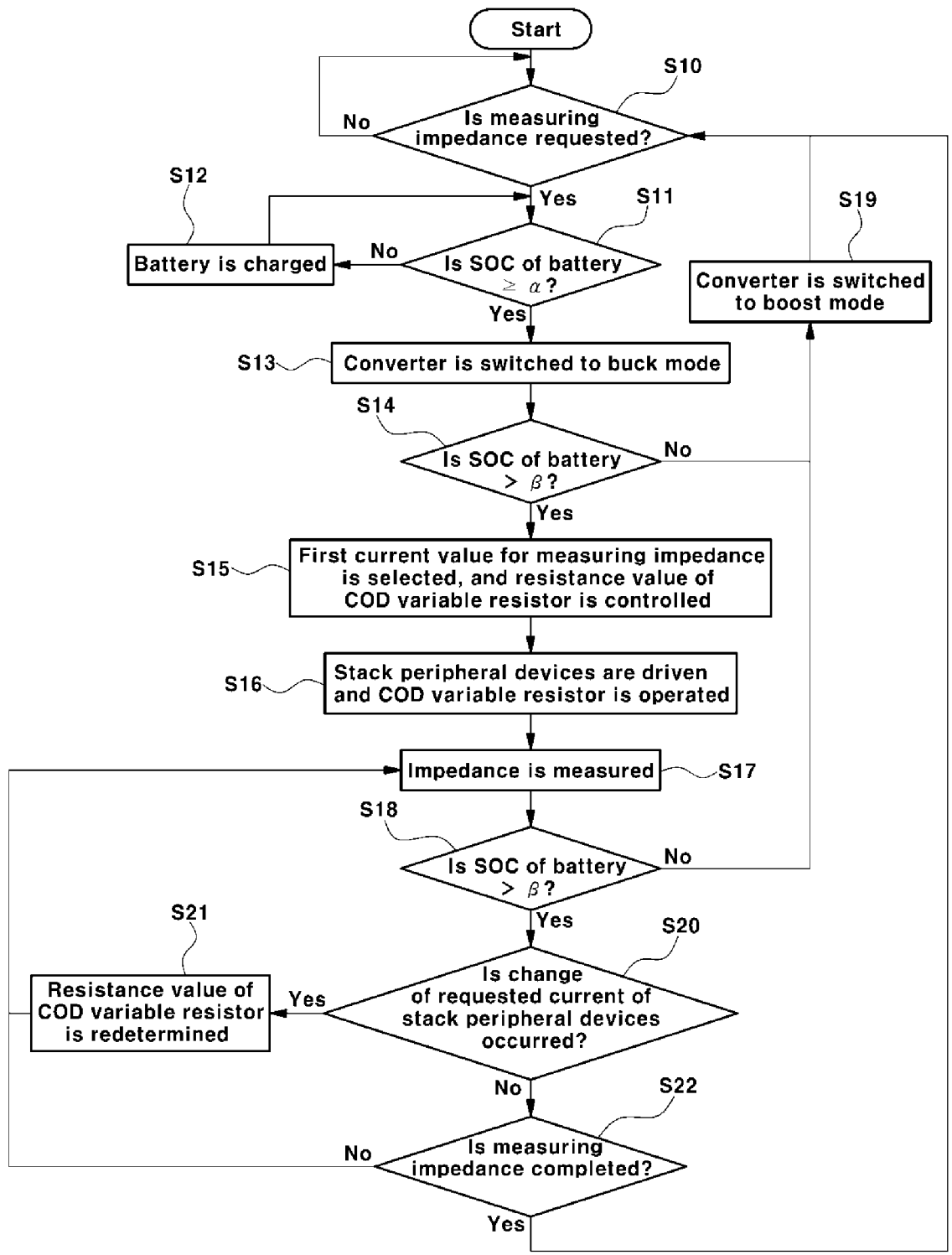
FIG. 3 is a view illustrating a control process for measuring the impedance of the fuel cell stack according to the present disclosure.

As illustrated in FIG. 3, at step S10, first, the fuel cell controller 11 determines whether measuring the impedance of the fuel cell stack 1 is requested while the vehicle is in operation. The fuel cell controller 11 determines that measuring the impedance is requested provided the request signal for measuring the impedance of the fuel cell stack 1 is received from the impedance meter 8.

When the request signal is received, at step S11, the fuel cell controller 11 determines whether the SOC of the battery 2 is no less than a predetermined first reference value α. When the SOC of the battery 2 is less than the first reference value α, at step S12, the battery 2 is charged using the fuel cell stack 1, and when the SOC of the battery 2 is no less than a predetermined first reference value α, at step S13, the DC-DC converter 5 is switched to the buck mode.

Next, at step S14, it is determined whether the SOC of the battery 2 exceeds the second reference value β. When the SOC of the battery 2 exceeds the second reference value β, at step S15, a first current value for measuring the impedance of the fuel cell stack 1 is selected, and with the first current value as a reference, the resistance value of the COD variable resistor 6 is controlled to the first resistance value.

Next, to allow the fuel cell stack 1 to be operable, at step S16, the stack peripheral devices 7 are driven and the COD variable resistor 6 is operated.

Subsequently, at step S17, the impedance of the fuel cell stack 1 is measured using the impedance meter 8.

After applying a very small AC signal to the voltage terminal (output terminal) of the fuel cell stack 1 for each frequency band at the first current value (operating point) of the fuel cell stack 1, the impedance meter 8 measures the impedance of the fuel cell stack 1 using the amplitude and phase difference of the response signal with respect to the applied AC signal.

The SOC of the battery 2 is monitored while the impedance of the fuel cell stack 1 is measured. That is, at step S18, it is determined whether the SOC of the battery 2 exceeds the preset second reference value β. At this time, as a result of the determination, when the SOC of the battery 2 exceeds the second reference value β, the impedance of the fuel cell stack 1 is measured in succession, and when the SOC of the battery 2 is no greater than the second reference value β, at step S19, the DC-DC converter 5 is switched to the boost mode.

In addition, while the impedance of the fuel cell stack 1 is measured, the requested current of the stack peripheral devices 7 is monitored and, at step S20, whether changes thereof occur is determined.

When it is determined that the requested current of the stack peripheral devices 7 is changed, at step S21, the resistance value of the COD variable resistor 6 is re-determined, thereby allowing the output of the fuel cell stack 1 to maintain the first current value.

When it is determined that the requested current of the stack peripheral devices 7 is unchanged, measuring the impedance of the fuel cell stack 1 is continued.

While measuring the impedance of the fuel cell stack 1 is performed, at step S22, the fuel cell controller 11 determines whether the impedance meter 8 completes measuring the impedance of the fuel cell stack 1 operated at the first current value.

On the other hand, when it is determined at step S14 that the SOC of the battery 2 is no greater than the second reference value β, at step S19, the fuel cell controller 11 switches the DC-DC converter 5 to the boost mode. When the DC-DC converter 5 is operated in the boost mode, the output of the fuel cell stack 1 is supplied to the motor 3 which is for driving the vehicle through the DC-DC converter 5.

When it is determined at step S22 that measuring the impedance of the fuel cell stack 1 is completed, at step S10, the fuel cell controller 11 determines whether the impedance meter 8 requests measuring the impedance of the fuel cell stack 1 again.

The fuel cell controller 11 determines whether measuring the impedance of the fuel cell stack 1 is further required to secure the impedance value which is required for understanding the physical phenomenon of the internal state of the fuel cell stack 1.

When it is determined that measuring the impedance of the fuel cell stack 1 is requested again, the fuel cell controller 11 becomes to perform the steps S11 to S22 again.

At this time, at step S15 above, the current value for measuring the impedance of the fuel cell stack 1 is reselected to a current value (second current value) different from the first current value, the resistance value of the COD variable resistor is controlled according to the second current value, and, while the output current of the fuel cell stack 1 maintains the second current value, at step S17, the impedance of the fuel cell stack 1 is re-measured.

The fuel cell controller 11 may repeatedly perform the steps S11 to S22 when measuring the impedance of the fuel cell stack 1 is requested, and accordingly, the impedance of the fuel cell stack 1 at various current values (operating points) may be measured and obtained.

As described above, when the physical phenomenon of the internal state of the fuel cell stack 1 is analyzed using the impedance of the fuel cell stack 1 measured at various current values, it is possible to analyze more accurately than when using the impedance of the fuel cell stack 1 measured and obtained at one current value.

Figure 4:
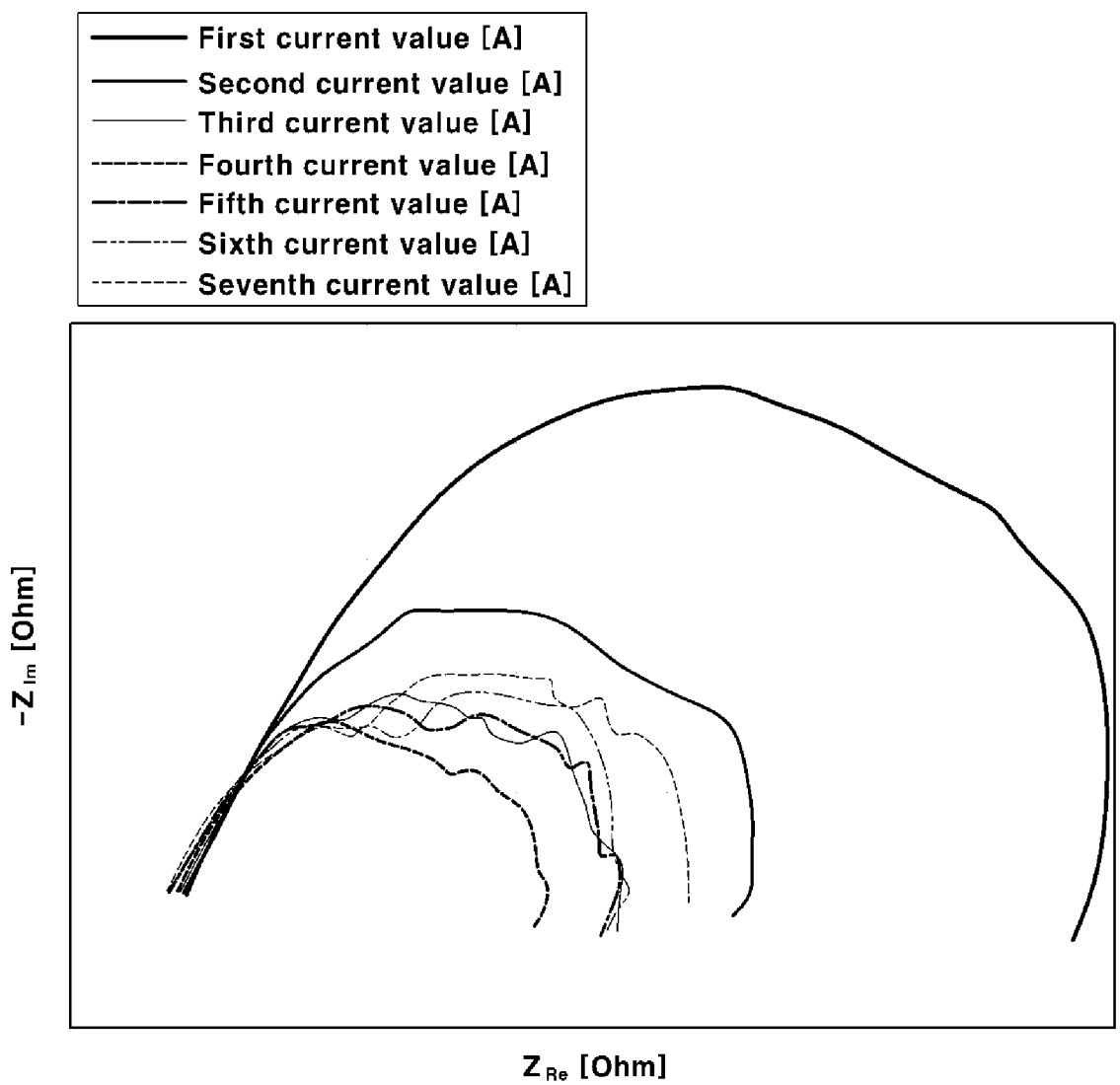
FIG. 4 is a graph illustrating an example of impedances for frequency bands measured at various current values at which the fuel cell stack is operated.

FIG. 4 is a graph illustrating an example of impedances for frequency bands measured at various current values at which the fuel cell stack is operated. Looking at FIG. 4, graphs of impedance measured at each current value at which the fuel cell stack is operated illustrate various aspects.

Therefore, when the impedance of the fuel cell stack is measured and obtained at various current values (operating points), it is possible to more accurately grasp the internal physical phenomenon of the fuel cell stack.

Although a preferred embodiment of the present disclosure has been described for illustrative purposes, those skilled in the art will appreciate that various modifications, additions, and substitutions are possible, without departing from the scope and spirit of the disclosure as disclosed in the accompanying claims.

What is claimed is:

1. A method for measuring impedance of a fuel cell stack in a vehicle, the method comprising:
   a first step of receiving instructions at a fuel cell controller to determine whether measuring the impedance of the fuel cell stack is requested during driving of the vehicle driven by using power of a fuel cell stack;
   a second step of switching a DC-DC converter connecting the fuel cell stack to a battery to a buck mode when measuring the impedance is requested, thereby blocking output current of the fuel cell stack from flowing to the battery through the DC-DC converter such that when the impedance of the fuel cell stack is measured, influence of components connected to the DC-DC converter through a second junction box is removed;
   a third step of determining a first current value of the fuel cell stack for measuring the impedance;
   a fourth step of controlling a resistance value of a COD variable resistor consuming the output current of the fuel cell stack according to the first current value, wherein, when a requested current of stack peripheral devices changes, a requested current of the COD variable resistor is recalculated by subtracting the changed requested current of the stack peripheral devices from the first current value and then the resistance value of the COD variable resistor is re-determined in accordance with the recalculated requested current of the COD variable resistor; and a fifth step of measuring the impedance of the fuel cell stack while the output current of the fuel cell stack is maintained at the first current value.

2. The method of claim 1, wherein, when determined that measuring the impedance of the fuel cell stack is requested in the first step, before switching the DC-DC converter to the buck mode, increasing a state of charge (SOC) of the battery to no less than a preset first reference value through charging using the fuel cell stack.

3. The method of claim 2, wherein the SOC of the battery is monitored during impedance of the fuel cell stack is measured for each preset frequency band in the fifth step, and when the SOC of the battery is no greater than a second reference value less than the first reference value by a predetermined value, measuring the impedance of the fuel cell stack is stopped, and the DC-DC converter is switched to a boost mode, thereby allowing the output of the fuel cell stack to be supplied to a motor for driving a vehicle through the DC-DC converter.

4. The method of claim 2, wherein when the SOC of the battery is no greater than a second reference value less than the first reference value by a predetermined value after the DCDC converter is switched to the buck mode, switching the DC-DC converter to a boost mode, thereby allowing the output of the fuel cell stack to be supplied to a motor for driving a vehicle through the DC-DC converter.

5. The method of claim 4, wherein the motor is electrically connected to the battery through the second junction box connecting the battery to the DC-DC converter.

6. The method of claim 1, wherein when the DC-DC converter is operated in the buck mode, operating the fuel cell stack to output current according to the requested current of the COD variable resistor and the stack peripheral devices.

7. The method of claim 6, wherein when the requested current for driving the stack peripheral devices is changed while the impedance of the fuel cell stack is measured in the fifth step, changing the resistance value of the variable resistor for each preset frequency band, thereby maintaining the output of the fuel cell stack to the first current value.

8. The method of claim 6 wherein the COD variable resistor is electrically connected to the fuel cell stack through a first junction box connecting the fuel cell stack to the DC-DC converter, and the stack peripheral devices are electrically connected to the fuel cell stack through the first junction box.

9. The method of claim 1, wherein when measuring the impedance of the fuel cell stack is completed in the fifth step, determining whether measuring the impedance of the fuel cell stack is re-requested.

10. The method of claim 9, wherein, when measuring the impedance of the fuel cell stack is re-requested a second current value for measuring the impedance is determined, controlling the resistance value of the COD variable resistor according to the second current value, and re-measuring the impedance of the fuel cell stack while the output current of the fuel cell stack maintains the second current value.

11. The method of claim 10, wherein the second current value is different from the first current value.

12. A method for measuring impedance of a fuel cell stack in a vehicle, the method comprising:

a first step of receiving instructions at a fuel cell controller to determine whether measuring the impedance of the fuel cell stack is requested during driving of the vehicle driven by using power of a fuel cell stack;

a second step of switching a DC-DC converter connecting the fuel cell stack to a battery to a buck mode when measuring the impedance is requested, thereby blocking output current of the fuel cell stack from flowing to the battery through the DC-DC converter such that when the impedance of the fuel cell stack is measured, influence of components connected to the DC-DC converter through a second junction box is removed, wherein the DC-DC converter includes an internal circuit configured to prevent the output current of the fuel cell stack from being applied to the second junction box when operating in the buck mode;

a third step of determining a first current value of the fuel cell stack for measuring the impedance;

a fourth step of controlling a resistance value of a COD variable resistor consuming the output current of the fuel cell stack according to the first current value, wherein, when a requested current of stack peripheral devices changes, a requested current of the COD variable resistor is recalculated by subtracting the changed requested current of the stack peripheral devices from the first current value and then the resistance value of the COD variable resistor is re-determined in accordance with the recalculated requested current of the COD variable resistor; and a fifth step of measuring the impedance of the fuel cell stack while the output current of the fuel cell stack is maintained at the first current value.

* * * * *